A. F. POOLE.
CALCULATING MACHINE.
APPLICATION FILED JULY 12, 1912.
1,198,050.
Patented Sept. 12, 1916.
10 SHEETS—SHEET 10.
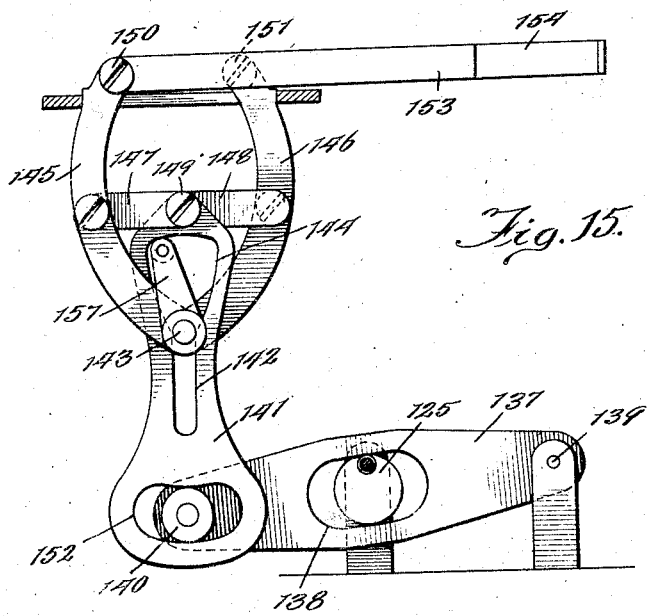
Fig. 15.
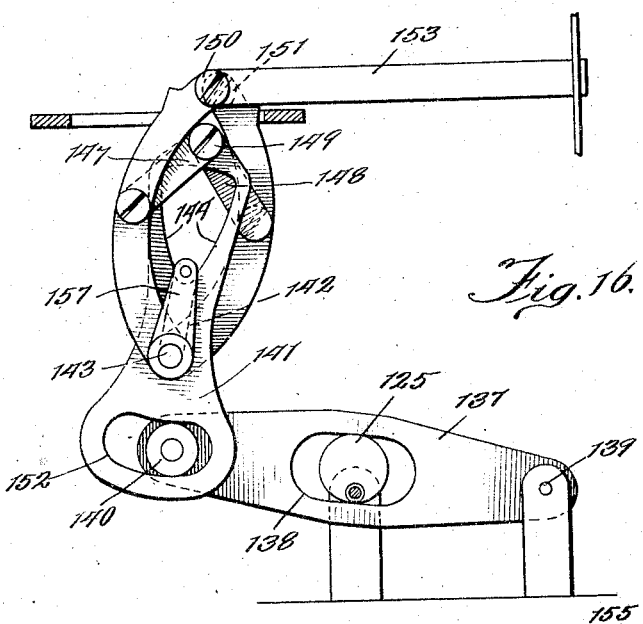
Fig. 16.
Fig. 17.
Witnesses:
Inventor:
Arthur F. Poole

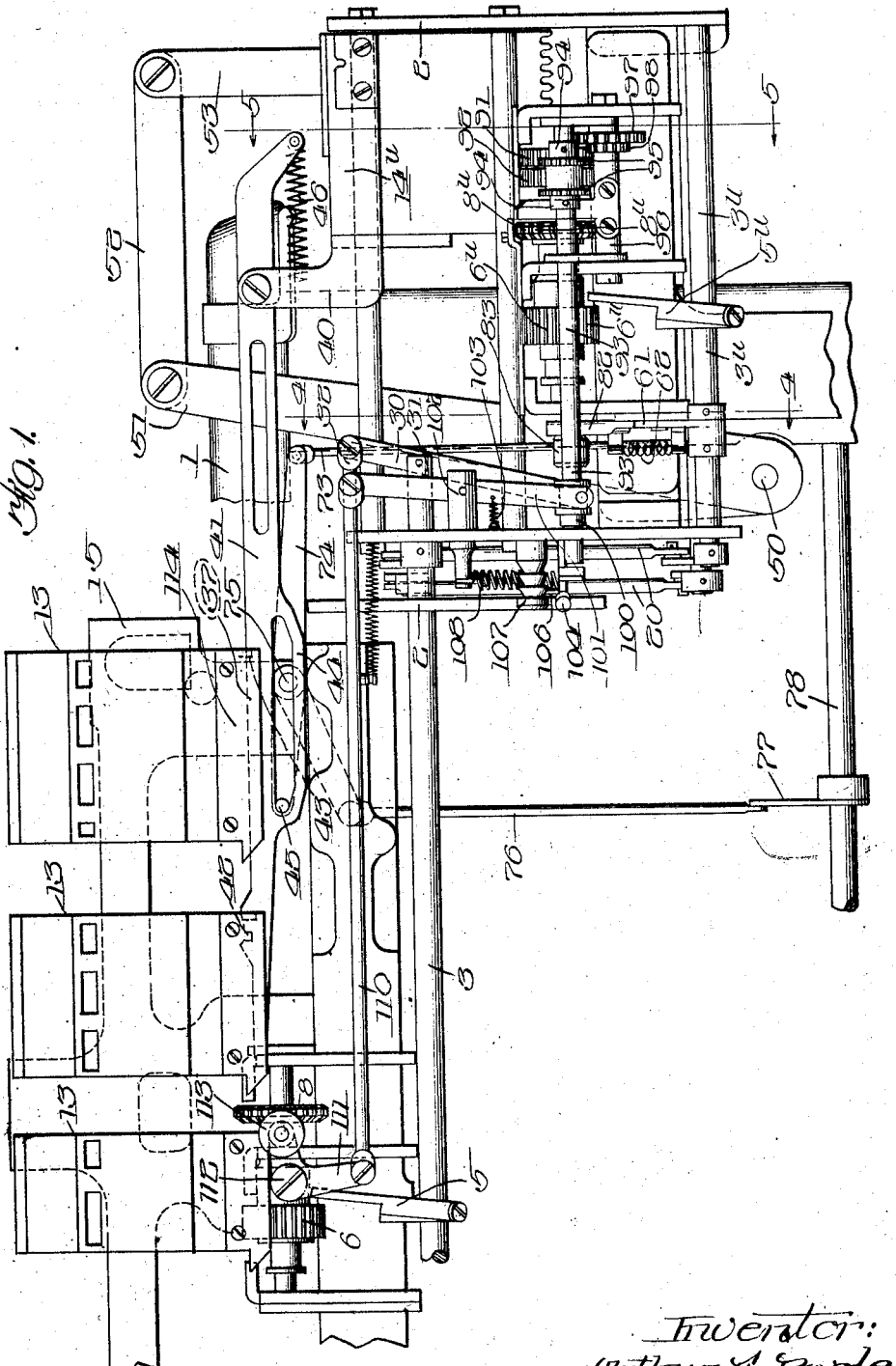

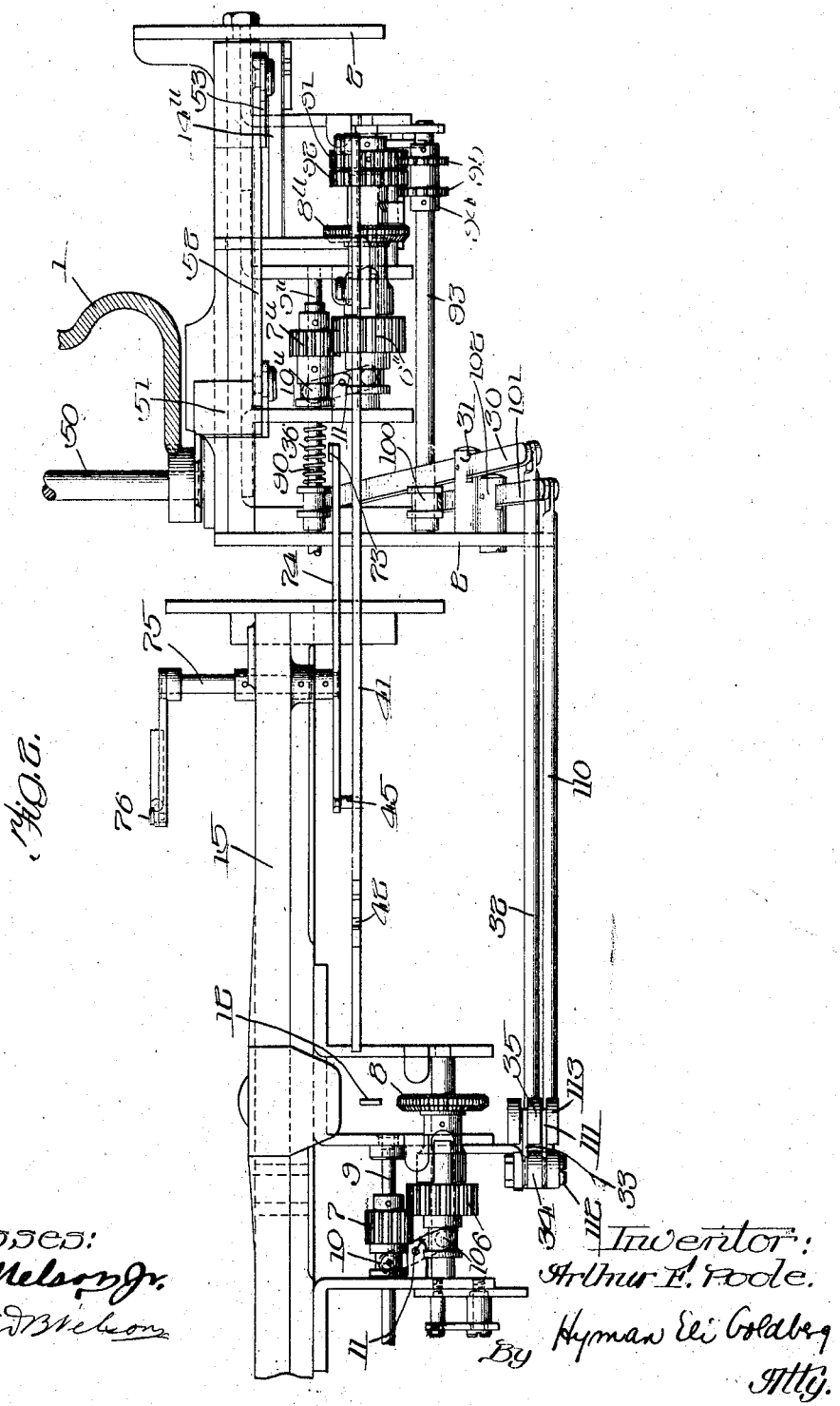

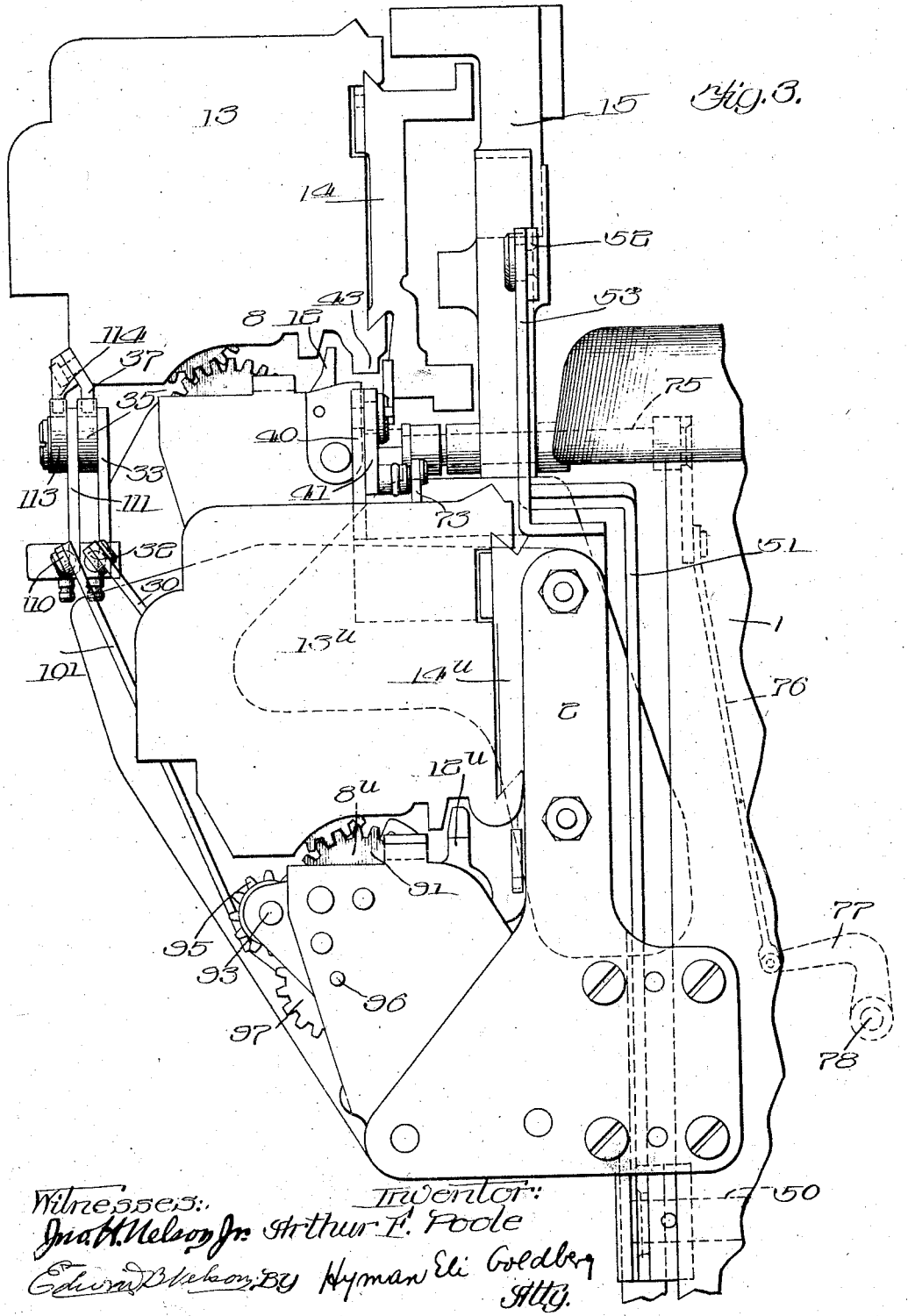

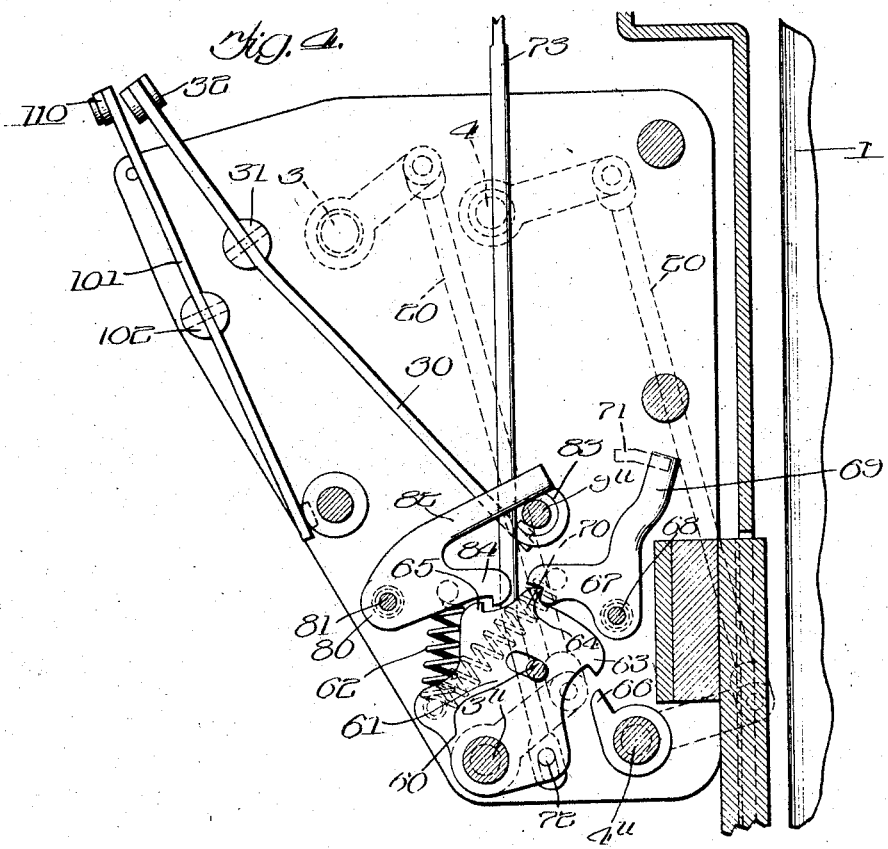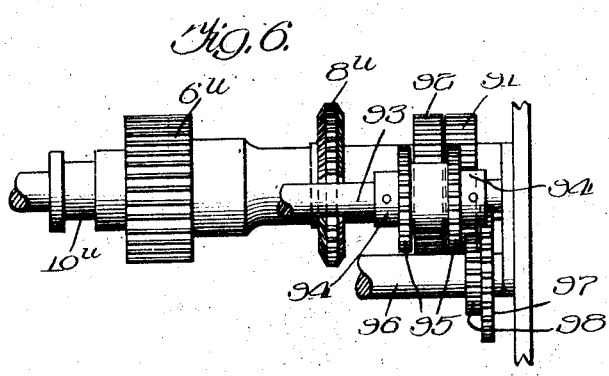

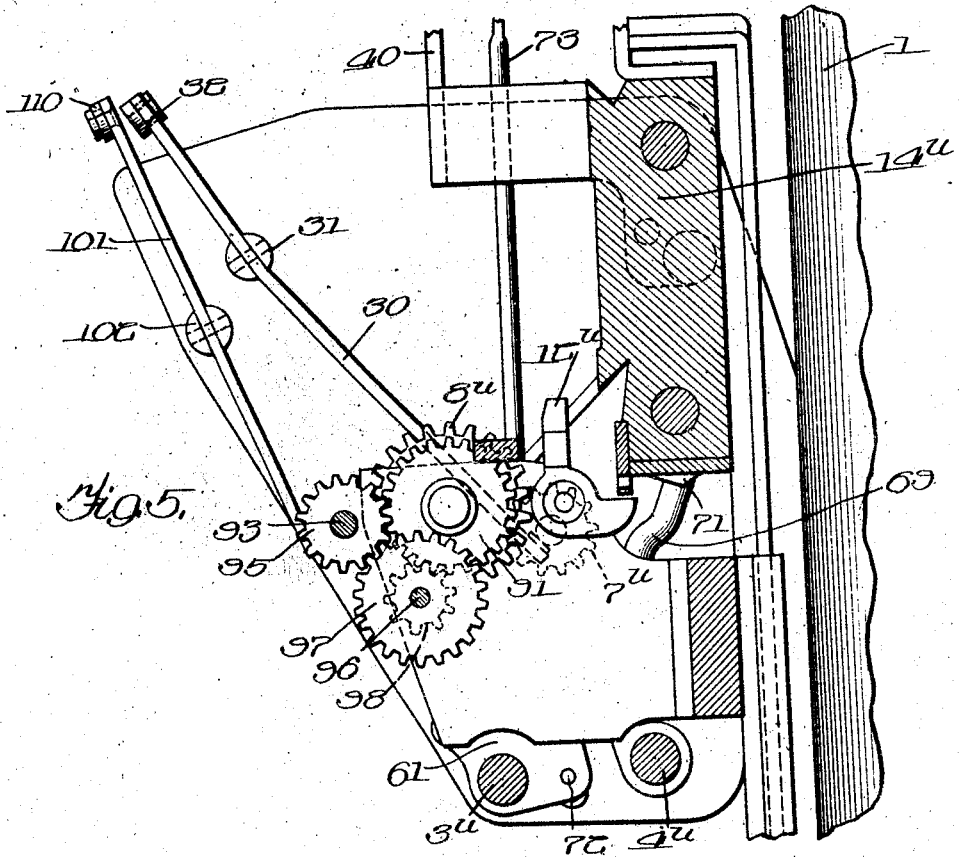

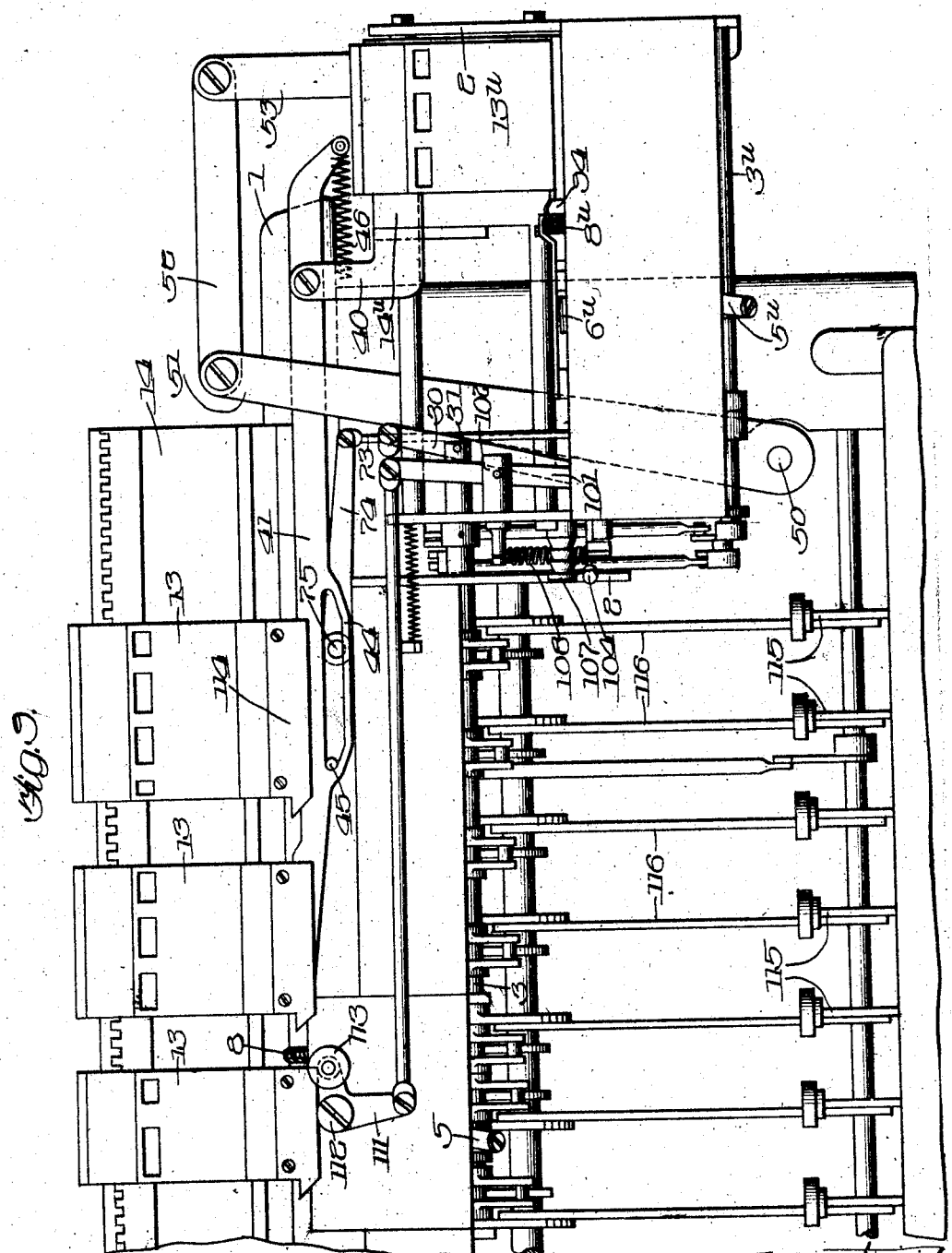

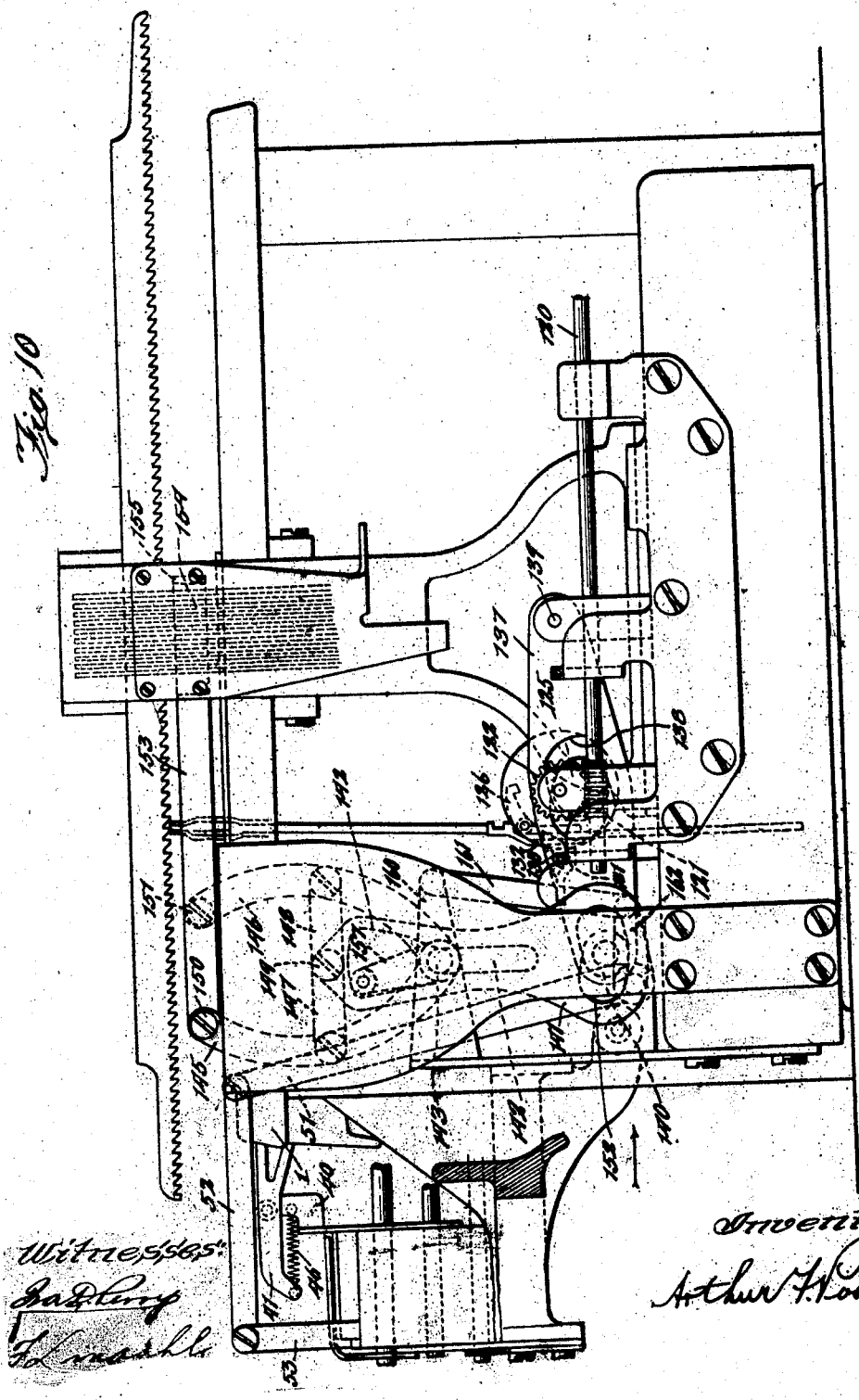

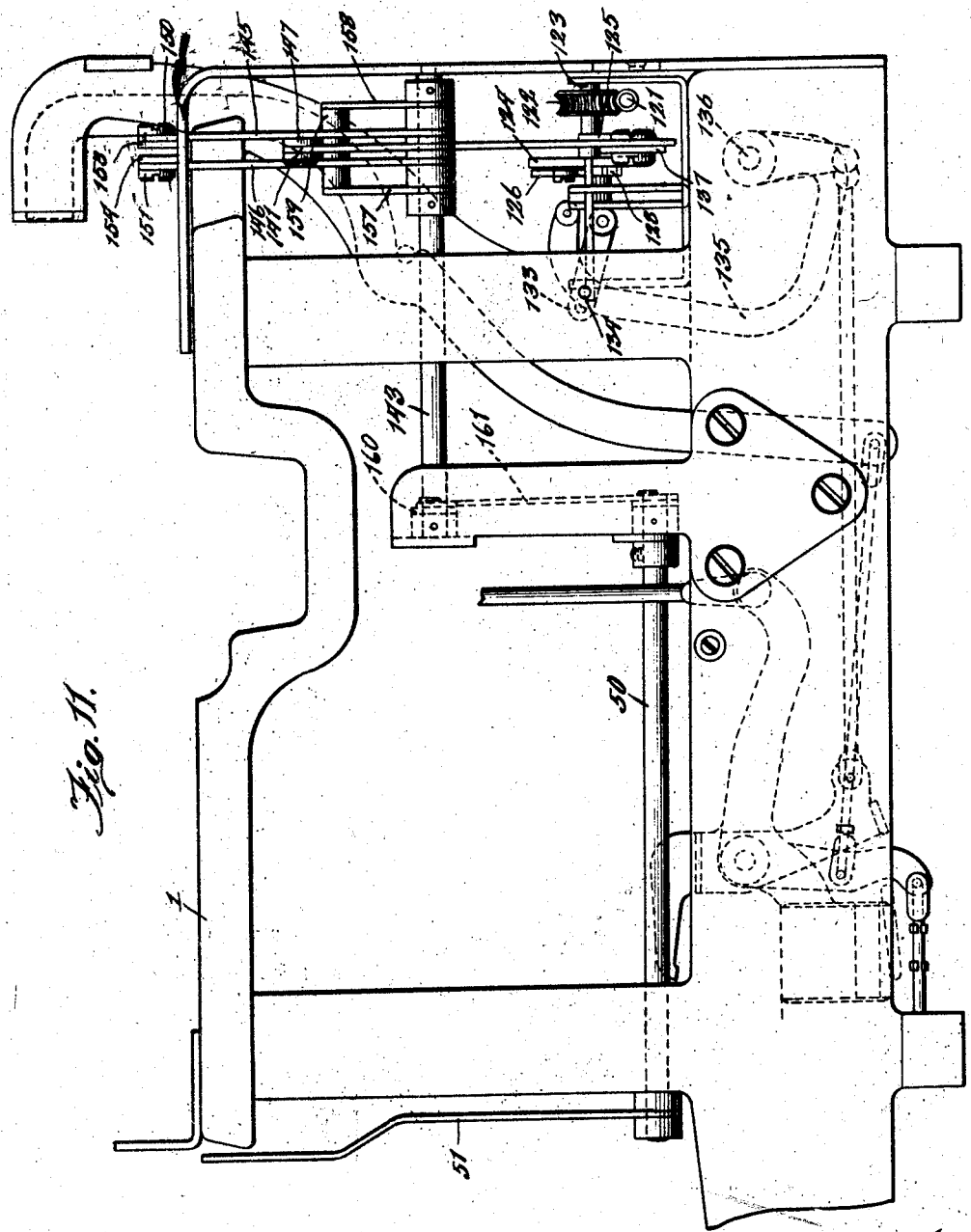

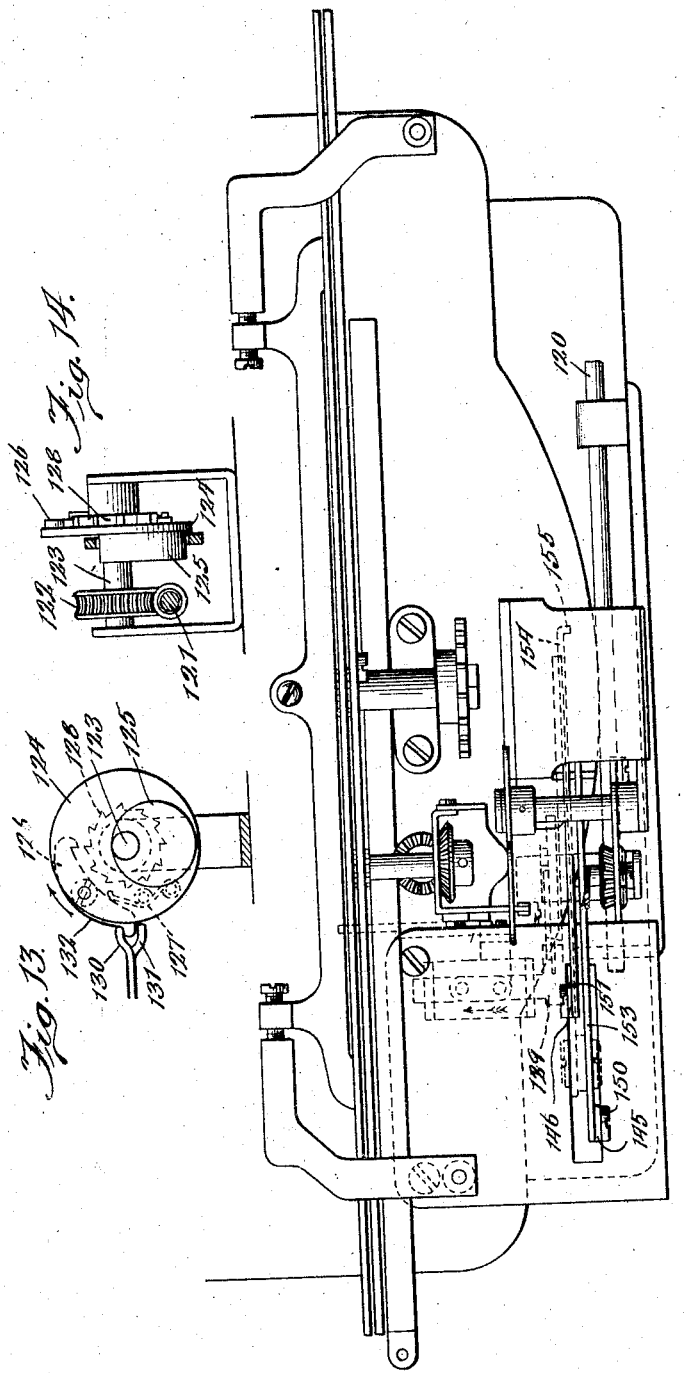

UNITED STATES PATENT OFFICE.

ARTHUR F. POOLE, OF CHICAGO, ILLINOIS, ASSIGNOR TO WAHL ADDING MACHINE COMPANY, OF WILMINGTON, DELAWARE.

CALCULATING-MACHINE.

1,198,050.  Specification of Letters Patent.  Patented Sept. 12, 1916.

Application filed July 12, 1912. Serial No. 709,0..

*To all whom it may concern:*

Be it known that I, ARTHUR F. POOLE, a citizen of the United States, residing at Chicago, in the county of Cook and State of Illinois, have invented certain new and useful Improvements in Calculating-Machines, of which the following is a specification.

My invention is a calculating machine. While capable of being changed in construction without change in principle to be used as an independent calculating machine, it is shown in the drawings and described in the specification as an attachment to the Remington typewriter now on the market.

The calculating machine of this application might be considered as an outgrowth and development of the calculating machine now on the market in connection with the Remington typewriter and which is described in detail in Patent No. 893,719, issued to John C. Wahl, July 21, 1908.

One of the objects of the present invention is the construction of a machine provided with a universal calculating mechanism and also with a columnar calculating mechanism. By a universal calculating mechanism is meant mechanism which is able to add numbers arranged anywhere on the sheet. By a columnar calculating mechanism is meant a mechanism which is able to add numbers placed on the sheet under each other in columnar arrangement.

More particularly stated another object of my invention is the construction of a calculating machine embodying both columnar calculating mechanism and universal calculating mechanism and having its new portions as far as possible a duplicate of the calculating machine above cited as being now on the market. By this means the new portion is practically as reliable as the well tested out old portion and is decidedly cheaper in construction than it would be if its parts were different in shape.

Another object of my invention is such a construction of the universal mechanism as to readily adapt it for hand tabulation. By this is meant that the universal calculating mechanism is brought from its preceding to its succeeding desired position through the intermediation of the hand operated tabulator of the typewriting calculating machine.

Another object of my invention is the construction of a machine containing columnar totalizers in combination with a hand tabulatable universal totalizer. Another object of this invention is an interlock between the columnar mechanism and the universal mechanism. As the carriage of the typewriter is capable of being advanced not only by means of the tabulating mechanism but also by means of the spacing bar of the typewriter and also manually, it sometimes happens that the operator forgets to tabulate the universal mechanism to bring it into coöperation with the columnar mechanism. The interlock just mentioned prevents any such oversight by preventing the operator from depressing the numeral keys of the machine and thus calling his attention to the wrong condition of affairs.

Another object of the invention is a total sign changing mechanism. By this is meant that a total present in a totalizer as an additive number is automatically converted into a total of the same numerical value but of negative sign, and vice versa. This is a very useful function and an example of its application will be given in the specification below.

Another object of my invention is the particular construction of the total sign changing mechanism. In the construction to be described the sign changing of the total is accomplished by removing the total from the totalizer and simultaneously and automatically replacing said total in the totalizer but with its sign reversed.

Another object of my invention is the still more particular form of construction of this total sign changing mechanism. In the construction to be described the changing of the sign of the total is accomplished by giving to the master gear that operates upon the carrying wheel of the totalizer *seriatim*, a movement which is twice as great as the movement necessary to remove the total from said totalizer.

Another object of my invention is the combination of a total sign changing mechanism in one calculating portion of the machine with an ordinary calculating mechanism in another portion of the machine. By this means a total present in the ordinary portion of the machine may be transferred with its sign reversed to the total sign changing portion of the machine, and vice versa.

Another object of my invention is the provision of cam mechanism whereby the various functions mentioned above are brought into operation automatically.

There are several other objects of the invention which will be explained in the body of the specification.

The invention is illustrated by the accompanying drawings forming part of the specification.

In the actual calculating machine there are a very great number of parts whose functions and operations in this machine are in no way different from their functions and operations in the machine now on the market and described in the above cited patent. The representing of all of these parts in the drawings would not help to explain the operations of the new portions. On the contrary owing to their very presence they would tend to confuse the following up of the new portions. These old parts have therefore been left out.

Bearing these remarks in mind, Figure 1 is a front elevation of the calculating machine as mounted on the typewriter. Fig. 2 a plan thereof. Fig. 3 an elevation looking from the right side toward the machine. Fig. 4 an elevation showing the interlock. Fig. 5 an elevation taken on the plane 5—5 of Fig. 1. Figs. 6, 7 and 8 show details. Fig. 9 is a partial front elevation. Fig. 10 is a partial back view of the machine showing an elevation of the mechanism for tabulating the universal totalizer. Fig. 11 is a partial view of the tabulating mechanism viewed in the direction of the arrow in Fig. 10. Fig. 12 is a partial top view of the tabulating mechanism. Figs. 13 and 14 are details of the clutch employed in connection with the tabulating mechanism. Fig. 15 is an illustration of the constant aggregate motion linkage in its normal position. Fig. 16 is a view of this same linkage in its retracted position. Fig. 17 is a section of the tabulator stops showing the bars contacting with a protruded stop.

The typewriter on which this calculating machine is mounted is the ordinary Remington typewriter now on the market. It is provided with a framework 1, key levers operating type bars, and a carriage traveling to determine the printing point. Mounted on the typewriter and actually present in almost all commercial machines and supposed to be present on the typewriter of this specification is a tabulator. This tabulator by its operation causes the carriage to be brought rapidly from its preceding position to the next desired position.

Mounted upon the framework 1, of the typewriter, is a framework 2 of the calculating machine. In reality there is no reason why the two frameworks 1 and 2 cannot be combined in one. Their separation is simply a matter of convenience.

Among the key levers of the typewriter are the numeral key levers 115. These are connected by the usual linkages to the type bars and associated printing mechanism (not shown) which serve to print the value of the operated key lever on a work sheet. The key levers 115 are also connected by links 116 to certain portions of the calculating machine. The operating of any of the numeral key levers causes the operating of its coöperating parts. Said coöperating parts are the sector, sector shaft and the rock shaft. In the above cited patent (see particularly Figs. 3 and 4) the sector shaft is numbered 69, the sector itself 68 and the rock shaft 89. The various operations of the sector shaft, rock shaft and sector are thoroughly described in the cited patent. The effects produced by the operating of any key were: on the sector shaft, a vibrating of said shaft to an amount dependent upon the value of the numeral key operating; on the rock shaft, the movement thereof an amount which was equal for any of the keys operating; on the sector itself, a meshing previous to its stroke, a remaining in mesh during its stroke, an unmeshing after its stroke, and a remaining unmeshed during its return or restroke.

In the present drawings the sector shaft is numbered 3 the rock shaft 4 (Fig. 4) and the sector itself 5 (Figs. 1 and 4).

The sector is normally inclined or in a position shown in Fig. 1. In said position it is out of mesh with the direct gear 6 and all the more out of mesh with the reverse gear 7, (Figs. 1 and 2). By the mechanism previously mentioned, during the first part of the operating of the numeral key levers the sector 5 is brought into a position to have its plane perpendicular to the axis of the sector shaft 3. In this latter position the sector 5 meshes with the right end of the direct gear 6. The movement of the sector is thus transmitted to the direct gear, which is rotatably mounted upon the supporting shaft in the framework. Mounted upon the same shaft and splined to said direct gear is a master gear 8. Any rotation of the direct gear is thus imparted to an equal amount to the master gear. The direct gear is not only rotatable in the framework but also axially slidable thereon. The reverse gear 7 which is always in mesh with the direct gear 6 is rotatably mounted on its supporting shaft 9 but not slidably mounted thereon. The sliding of the shaft 9 therefore causes the displacement of the reverse gear in a direction parallel to its axis. Both the reverse gear 7 and the direct gear 6 are provided with grooves wherein are inserted pins 10 forming part of the lever 11 pivoted in the framing. The displacement of the reverse gear by means of its axle 9 therefore causes the displacement of the direct gear 6 in an opposite direction.

In Fig. 2 the location of the parts is such that the direct gear 6 would be meshed with by the sector 5 when the latter is brought to its meshing position. The reverse gear 7 would not be meshed with. The bringing of the axle 9 somewhat to the right would bring the reverse gear 7 an equal amount to the right and the direct gear 6 an equal amount to the left. In this location of parts both the direct and the reverse gears would be unmeshable by the sector. The bringing of the axle 9 still farther to the right would bring the reverse gear into its extreme position to the right and the direct gear into its extreme position to the left. In this position of the parts the reverse gear would be meshed with by the sector when the latter is brought to its meshing position and the direct gear would not be meshed thereby. In the first of the above said positions the movement of the sector would thus result in the driving of the master gear 8 in a definite direction. This will be called the positive or additive direction. In the second of said positions the master gear will not be moved at all. In the third of said positions the sector would first engage the reverse gear which in turn would drive the direct gear, and the master gear would thus have imparted thereto movement in a direction opposite to the one described as the additive direction. This opposite direction will be called negative or subtractive direction. It is thus seen that the master gear 8 may be brought into its additive, nonactive, or subtractive, condition, by the proper locating of the axle 9. In the machine itself the axle 9 is shifted by a mechanism at the extreme left of said machine but as the latter is not part of this invention and need not be described for the understanding of the operation of the invention it will not be further entered upon.

In the machine now on the market there are a number of parts coöperating with the ones so far described, such as overthrow preventers, and other safety devices. These will not be described except one. This is the master dog 12 mounted immediately behind the master gear 8 and coöperating therewith. The master dog is operated by proper mechanism driven by the rock shaft 4. The movement which the master dog has imparted thereto is: first a movement of its extreme upper portion toward the front (left in Fig. 3) before the beginning of rotation of the master gear, second a dwelling during the rotation of the master gear, and third a returning to its original position immediately after the end of the rotation of the master gear.

The master gear and master dog coöperate with mechanism mounted in the totalizers 13 (Figs. 1 and 3). The latter are mounted upon a totalizer bar 14 which bar in turn is connected to the carriage 15 of the typewriter. As the latter travels in order to determine the printing point it causes the travel of the totalizer bar and the totalizers mounted thereon and thus carries the mechanism in the totalizers over the master gear 8 and the master dog 12. The operating of said master couple (master gear and master dog) thus operates the mechanism of the totalizer and causes the addition of the numbers thus entered in the totalizer. All the above parts are old, found in the machine now on the market, thoroughly described in the above cited and other patents and will not further be explained.

Attention is called to the fact that the totalizers 13 traveling with the carriage 15 of the typewriter serve to obtain the totals of the numbers printed upon the paper in columnar arrangement. These are therefore columnar totalizers.

In the machine of this application there are provided not only columnar totalizers but also the universal totalizer $13^u$ (Figs. 1 and 3). The latter is mounted upon a short universal totalizer bar $14^u$ which is slidably mounted upon two bars forming part of the framing 2 of the calculating machine. For the operating of the universal totalizer there is provided a master gear $8^u$ and master dog $12^u$, a direct gear $6^u$ and reverse gear $7^u$, a sector $5^u$ and sector shaft $3^u$ and a rock shaft $4^u$. All the parts here mentioned are shaped not only similarly but are equal in size to their corresponding parts previously mentioned. Moreover, the new sector shaft $3^u$ is connected to the old sector shaft 3 by means of the link 20 (Fig. 4) mounted upon arms 21 rigidly fastened to the ends of the old sector shaft 3 and the new sector shaft $3^u$. Similarly the new rock shaft $4^u$ is connected to the old rock shaft 4 by means of similar arms 21 and a similar link 20. An examination of Fig. 3 will show that the universal totalizer $13^u$ and all its coöperating mechanism has been very carefully retained in its same orientation as the columnar totalizers 13 and their coöperating mechanisms. The new mechanism is displaced it is true; but this displacement is rectilinear and not angular. As a result thereof the distance between the axes of the old sector shaft and the new sector shaft is equal to the distance between the old rock shaft and the new rock shaft. As the four arms 21 are all equal in length and as they are fastened to their respective shafts in similar angular positions it is evident that both for the sector shafts and the rock shafts the mechanism composed of the four links, namely the framing as the stationary link, the two arms 21 and the link 20 form in each case a parallelogram. Consequently any movement that the old sector shaft 3 has imparted thereto is imparted to an equal amount to the new sector shaft $3^u$. Similarly both the old and the new rock shafts 4 and $4^u$ receive equal movements. Consequently the operating of any of the numeral key levers of the typewriter operates the two sectors 5 and $5^u$ and the two master dogs 12 and $12^u$ and their connecting parts not only in a similar but in an equal manner.

The chain of equal movements breaks with the sectors. In the columnar mechanism the master gear 8 is placed in a condition which is additive, nonactive or subtractive according to the manual locating of the axle 9. Similarly the universal mechanism is provided with an axle $9^u$ (Fig. 2) which can also be placed in any of three positions and as a result whereof the master gear $8^u$ is brought into additive, subtractive or nonactive condition. It is evident that by the proper placing of the axles 9 and $9^u$ the direct gears 6 and $6^u$ may be given equal movement in the same or opposite directions or that each of the direct gears 6 or $6^u$ may be brought into a nonactive position while the other is still in its active position. Therefore when the master gears 8 and $8^u$ both move they move an equal amount in the same or opposite directions but it is also possible to move one without moving the other.

The actual movement of the shaft $9^u$ may be brought about manually, but it may be brought about also by means of cams and therefore automatically. Inserted in a groove on the shaft $9^u$ is the lower end of the lever 30 (Fig. 1) fulcrumed in the framing at 31 and connected at its upper end to a link 32 whose left end is connected to the lower end of a vertical arm of a lever 33 fulcrumed on the framing at 34 and provided with a roller 35 mounted on the end of an arm extending to the right from the fulcrum. Because of the chain of parts, movement of the shaft $9^u$ to the right is accompanied by a down movement of the roller 35 and vice versa. The roller 35 is normally in its elevated position being kept so by a spring 36 operative upon the shaft $9^u$. To bring it into either of its lower positions there are provided cams 37 attachably mounted to the front lower corner of the columnar totalizers 13. These cams are of three levels, a highest level, a middle level, and a lowest level. In its highest level the cam 37 does not depress the roller at all and may therefore be imagined to be not present. In this condition of affairs the master gear $8^u$ will be additive. The middle cam 37 will bring the roller to its middle position and the master gear $8^u$ into its nonactive condition. The lowest cam 37 or cam 70 of lowest level will bring the master gear $8^u$ into its subtractive condition. It is thus evident that by properly placing suitable cams upon the columnar totalizers the universal master gear $8^u$ is automatically instructed and will automatically be placed into proper condition and will add at certain predetermined locations, subtract at other certain predetermined locations, and will not operate at all at still other predetermined locations. Attention is here called to the fact that the totalizers 13 in so far as the action of the cams 37 are concerned need not have any mechanism inside. They might be dummy totalizers as they simply serve to support said cams. This might be advisable in case there are no columns to be added or in case there is only one column to be added, which can just as well be calculated by means of the universal totalizer only.

In the operation of the typewriting calculating machine the various figures of the number are printed not simultaneously but successively. Moreover the number is inserted in the totalizer in the same manner, namely the various decimal places thereof are inserted *seriatim*. This is accomplished by the travel of the carriage which carries the totalizer 13 over the master gear 8 and the master dog 12 and thus brings the various sections of mechanism in the totalizer successively over said master mechanism. In the machine of this application the universal totalizer $13^u$ is given a similar movement. It too is carried from right to left and brings its various decimal sections successively over its universal master mechanism. This movement is brought about through the chain of parts composed of the arm 40 (Figs. 1 and 2) rigidly fastened to the universal totalizer bar $14^u$ and the link 41 pivotally mounted upon said arm 40 and having at its left a slot 42 which is adapted to embrace an extension 43 from the lower back corner of the right wall of the columnar totalizer. Whenever said extension 43 is in the slot 42 and the columnar totalizer has any movement imparted thereto, then the universal totalizer $13^u$ will have an equal movement imparted thereto. Moreover the columnar totalizer and the universal totalizer will be located over their respective master mechanisms with the same decimal places.

In the operation of the machine the carriage of the typewriter and the columnar totalizer travel to the left. The particular columnar totalizer which has its extension 43 in engagement with the link 41 therefore also travels to the left. In due time it will pass beyond the columnar master gear 8. At this moment the connecting link 41 will become disconnected from the columnar to-talizer. This is accomplished by the incline 44, forming part of the link 41, coming in contact with a pin 45. As a result thereof the link 41 has its slot portion 42 depressed and disconnected from the extension 43.

It is to be noted that the extension 43 is on the right side plates of all the columnar totalizers, and that when the universal and any columnar totalizer are connected by the slot 42 in the link 41 engaging an extension 43, the length of this link 41 is such that the master wheels 8 and $8^a$ engage the same decimal places in their respective coöperating totalizers. The totalizers are disconnected by the action of the pin 45 on the incline 44. Since by hypothesis when the totalizers are connected the master wheels 8 and $8^a$ engage in similar decimal places,—that is, they are the same distance from the lowest decimal place of both totalizers—this disconnection will be independent of the width of the columnar totalizer engaged by the link 41. Of course, if the extension 43 were put on the left side plates of all the columnar totalizers, it would be necessary for such totalizers to be of the same width, for they all have to be disconnected when the last decimal place of a columnar totalizer is a predetermined distance from the master wheel 8. To avoid the necessity of having the columnar totalizers the same width the extension 43 is put on the right side plate, as shown.

It has previously been mentioned that the typewriter is provided with a tabulating mechanism whereby its carriage is rapidly brought from its last position to any desired new position. The tabulating mechanism thus brings the columnar totalizer to the left and locates it at a decimal place dependent upon the manual operation of the tabulator. Normally the carriage of the typewriter advances quite a long distance and carries more than one columnar totalizer over the columnar master gear. Afterward the carriage is brought back to its starting point. The advance of the carriage is therefore in the same direction for the successive numbers entered in the calculating machine. But the universal totalizer is given with the successive numbers a reciprocatory movement, one reciprocation for each number. For the columnar totalizer and the universal totalizer to be properly brought into coöperation for the next number both of them have to be located in the same decimal location. The columnar totalizer is advanced to its proper decimal location by means of the tabulator through the intermediation of the carriage, as is the case with the machine described in the above cited patent to Wahl. The universal totalizer is brought to its proper decimal location also by means of the tabulator but not through the intermediation of the carriage. This is accomplished by giving by means of the tabulator a proper location to the shaft 50 and thus to the arm 51 rigid therewith, link 52 connected thereto and post 53 which is rigid with the universal totalizer bar $14^a$. The manner of bringing the shaft 50 to its proper position will now be described.

On the back of the typewriter framing (Fig. 10), is mounted a shaft 120, which is kept continuously rotating by a suitable motor. This motor may be a small electric one, or the shaft 120 may be connected by a belt to a suitable prime mover. The left end of this shaft 120 (Fig. 10) is provided with a worm 121, which serves to drive a gear 122 (Figs. 10 and 14). This gear is rigid on a shaft 123 rotatably mounted in the framing. Loosely mounted on said shaft is a disk 124, on which is rigidly mounted an eccentric 125. On the disk 124 is mounted a dog 126, which is given a tendency by means of a spring 127 to engage the ratchet wheel 128 rotatably mounted on the shaft 123. The shaft 123 and the rigidly attached wheel 128 are kept in continuous rotation in the direction of the arrow (Fig. 13) by means of the motor previously described.

Slidably mounted in the frame work is a piece 129, having thereon two lugs 130 and 131. The piece 129 may be given a motion at right angles to the plane of the disk 124 by means hereafter to be described.

Referring to Figs. 12 and 13, it will be seen that in the normal position of the parts, the dog 126 is held out of engagement with the ratchet wheel 128 by means of the lug 130. Should this lug be moved out of the plane of the dog, the spring 127 will at once throw said dog into engagement with the ratchet wheel 128 whereupon the disk 124 will start to rotate in the direction of the arrow. This rotation will continue until a cam surface 132 upon the dog 126 will contact with the lug 131, and continued rotation of the dog 126 caused by the rotation of the disk 124 upon which said dog is mounted, will by action of the lug 131 on the cam 132 disengage said dog from said ratchet wheel. The disk 124 and the eccentric 125 attached thereto will thereupon come to rest. When the piece 129 is shifted to its normal position as shown in Fig. 12, the cam 132 will escape from the lug 131 and be stopped by the lug 130.

From the foregoing it will be seen that the parts just described form a clutch, such that there will be one revolution of the disk 124 corresponding to a reciprocation of the piece 129.

The piece 129 has connected thereto a link 133, and a slot in this link co-acts with the pin 134 rigidly mounted in the arm 135, pivoted on the shaft 136. This arm and shaft will be recognized as a standard part of the Remington tabulator, and without going into an extended description of said arm and shaft, it may be stated that when any tabulator key is pushed, this shaft is rotated in a counter-clockwise direction, and consequently the arm 135 through the pin and slot connection will displace the piece 129, in the direction of the arrow, from its position shown in Fig. 12. Therefore when any tabulator key is pressed, it is clear that there will be one revolution of the disk 124 and its attached eccentric 125.

I shall now describe how a revolution of the eccentric 125 results in tabulating the universal totalizer to the position determined by the particular tabulator key which has been operated.

Pivoted in the frame work at 139 is a lever 137 having therein a slot 138, adapted to coöperate with the eccentric 125 (Figs. 10 and 16). Rotation of the said eccentric results, therefore, in the up and down motion of the said lever 137. Mounted at the end of said lever is a roller 140 coöperating with a slot 142, in a cam 141. The slot 142 embraces a shaft 143 rotatably mounted in the frame work, and terminates in an enlarged portion 144.

Rotatably mounted on the shaft 143 is a pair of scissors arms 145 and 146. Each of these arms has pivoted to it a short link 147 and 148 respectively. These links are joined in a pivot 149 to the cam 141. The linkage comprising the scissors arms 145 and 146 and the links 147 and 148 will be hereinafter called the tabulating linkage.

As far as the parts have been described, if the cam 141 were raised from the position shown in Fig. 15 to that shown in Fig. 16, the pivots 150 and 151 in the arms 145 and 146 respectively, would be brought approximately into a line parallel to the shaft 143, but when this is done, the entire linkage would still be free to rotate about the shaft 143, since the slot 152 in the cam 141 is made with its surfaces concentric with the shaft 143, when said cam 141 is in the position shown in Fig. 16.

I shall now describe the means for locating this tabulating linkage into a position determined by a particular tabulator stop.

Referring to Figs. 15, 16 and 17, it will be seen that the scissors arm 145 has pivoted at 150 a bar 153. Also that the scissors arm 146 has pivoted thereto at 151 a bar 154, having a right angle projection 155. The bars 153 and 154 are so proportioned that when the scissors arms are thrown to the position shown in Fig. 16, there shall be between the right angle projection 155 and the bar 153 a space equal to the width of the tabulator stop 156.

To repeat what has been given before, operation of any tabulator key protrudes the tabulator stop 156 into the path of the bars 153 and 154. Protrusion of this stop, also by acting on the clutch, determines that the eccentric 125 shall make a complete revolution. When said eccentric is revolved approximately 180 degrees, the parts are brought to the position shown in Fig. 16, where the bars 153 and 154 embrace the protruded tabulator stop, and thereby determine the location of the tabulating linkage. Therefore it follows that each time a tabulator key is pressed, the entire linkage will locate itself in a position dependent on the particular tabulator stop which has been actuated.

I shall now describe the means by which this location of the linkage is transferred to the universal totalizer.

The shaft 143, it will be remembered, is rotatably mounted in the frame work, and has rigidly attached to it arms 157 and 158, which serve to support the roller 159. Reference to Figs. 11 and 15 will show that the roller 159 is in the path of the cam 141. Reference to Fig. 16 will show that when the cam 141 is raised to the extreme upper limit of its travel, the center of the shaft 143 is coincident with the semi-circle at the bottom of the slot 142, and that the roller 159 is embraced by said slot 142, thereby positively locating this roller in a position as determined by the position of the cam 141 when this cam is in its raised position.

Since the position of the cam 141 is determined by a particular tabulator stop, it follows that the roller 159 and consequently the shaft 143, will be brought to a position determined by the particular tabulator stop which has been operated.

Rigidly mounted on the shaft 143 is a second arm 160, which is connected by a link 161 to an arm 162, rigidly mounted on the shaft 50, rotating in the frame work. The forward end of the shaft 50 carries an arm 51 rigidly mounted thereon, and this arm is connected by a link 52 to the projection 53, which, it will be remembered, is rigid with the truck carrying the universal totalizer. The arms 160 and 162 are not of equal length, but are so proportioned as to compensate for the difference in length between the shaft 50 and the pivot connecting the link 52 to the arm 51, and the distance between the shaft 143 and the pivot 150, the object being to make the travel of the universal totalizer equal to the travel of the pivot 150.

While I have above described one particular form of tabulating mechanism, which can be used in connection with my invention, it is obvious that there are other forms which may be used, and that the tabulating mechanism *per se* is not a part of this present invention, being claimed in my co-pending application #716,939, filed August 22nd, 1912.

Indeed, the shaft 50 might be very well operated by hand, the operation being that after the columnar totalizer has been brought to its place by the tabulation of the main carriage of the typewriter, the universal totalizer is brought by hand to the place where the slot 42 in the arm 41 will engage the heel of the columnar totalizer. The two totalizers will thereafter travel together until the number has been inserted in both totalizers when the pin 45 by its action on the bar 41 will disconnect the two totalizers.

Attention is called here to the fact that there is no mechanism connected to the universal totalizer tending to bring it to any definite position. Its normal position would be at the extreme left of its zone of travel because that would be the position where it would be disconnected from the columnar totalizer. When in said position the columnar totalizer may travel and yet not engage the slot 42 of the connecting link 41. The carriage may therefore advance to any desired position or may be returned part way or all the way without moving the universal totalizer out of its place. Afterward the universal totalizer can again engage the carriage of the columnar totalizer or not, but it has to be previously moved out of its normal position and this is accomplished by tabulating it through the intermediation of shaft 50. This will carry the link 41 off from the extreme position into some nonextreme position and the link 41 by means of the spring 46 will thus rise up to engage such an extension 43 as may come in contact therewith.

Sometimes the operator moves the carriage of the typewriter and therefore also the columnar totalizers not by means of the tabulator but either manually or by means of the spacing bar. This of course has no effect upon the universal totalizer. Should any numeral key now be struck it might enter into the columnar totalizer but will not enter into the universal totalizer. This might result in error. An interlocking mechanism has therefore been introduced to prevent the pressing of any of the numeral keys whenever the universal totalizer is in a non-tabulated position when it should be in a tabulated position. As the universal totalizer is brought into its additive, subtractive or nonactive condition by means of the cams 37 upon the columnar totalizer, it is evident that the tabulated position of said universal totalizer is equivalent to either of its active conditions, namely additive or subtractive. Let it be recalled that the active condition of the universal totalizer is brought about by the placing of the shaft $9^u$ in either of its extreme positions while the nonactive position is brought about by the placing of said shaft in its middle position. The universal totalizer therefore requires tabulation preliminary to the entering of a number therein whenever said shaft $9^u$ is in either of its extreme positions, and does not require tabulation when the shaft is in its middle position. This condition of affairs is taken advantage of in the construction of the interlock whose mechanism will now be explained.

Fulcrumed upon a stud 60 (see Fig. 4) mounted in the framework is a ratchet piece 61. The fulcrum 60 happens to be coaxial with the universal sector shaft $3^u$ but this is merely a matter of convenience. The ratchet piece 61 is provided with a spring 62 which tends to move the top of said ratchet piece backward (to the right in Fig. 4). The ratchet piece is provided with several hook teeth. Among them are 63, 64 and 65. The hook tooth 63 coöperates with another hook tooth 66 rigidly fastened to the auxiliary rock shaft $4^u$. Whenever these two teeth, 63 and 66, are in engagement the auxiliary rock shaft cannot move. Because of the locking of the rock shaft the numeral keys of the typewriter cannot be depressed. This is the way in which the attention of the operator is attracted. The hook tooth 64 coöperates with a pawl 67 fulcrumed on the framing at 68 and provided with an arm 69. By means of the spring 70 the pawl 67 is given a tendency to move downward. Should said pawl engage its coöperating hook tooth then the ratchet piece 61 will be kept out of engagement with the rock shaft. The latter therefore would be free to move. Should the pawl 67 be raised then the ratchet piece would immediately engage the rock shaft and lock the numeral keys. The movement of the pawl 67 is brought about by the movement of the arm 69 forming a rigid part therewith. The latter is operated by a cam 71 rigidly fastened and forming part of the auxiliary totalizer bar $14^u$. Let it be recalled that the normal position of the auxiliary totalizer and of its bar is at the extreme left. In that position the cam 71 just reaches the arm 69 pushing it backward and raising the pawl 67 from the ratchet piece. As this is a position of the totalizer corresponding to a location one step lower than its lowest decimal place it is not an operative position of said totalizer. The release of the ratchet piece 61 permits it to engage the rock shaft and should any attempt be made by the operator to depress any of the numeral keys his attention would immediately be attracted. However in proper operation, the machine would next be tabulated. This would bring the universal totalizer to some position different from the one just mentioned. The arm 69 would thus no longer be pushed back by the cam 71. The pawl 67 would thus become ready to engage the hook 64 as soon as the latter is raised. This is accomplished by providing the ratchet piece 61 with a stud 72 which is engaged by the lower end of a link 73 whose upper end is connected to the right end of the lever 74 rigidly fastened to the shaft 75 fulcrumed in the framework, (see Figs. 1 and 2).

The lever 74 has the pin 45 rigid therewith. Let it be recalled that the function of the said pin 45 was to bring the link piece 41 connecting the universal totalizer with the columnar totalizer out of engagement with each other whenever the columnar totalizer reached either of its extreme positions. The shaft 75 is also provided with another arm connected to the upper portion of the link 76 which at its lower end is connected to an arm 77 rigidly fastened to the shaft 78 mounted in the framing of the typewriter, (see Fig. 3). The shaft 78 and the arm 77 are portions of the standard tabulator as now on the market. The operation of any of the keys of the tabulator results in the rotation of the shaft 78 counterclockwise. The operating of any of the keys would therefore also result in the drawing of link 76 downward and of link 73 upward. The effect of this would be to raise the ratchet piece 61 out of engagement with the auxiliary rock shaft and into engagement with the pawl 67. The latter immediately snaps in behind the tooth 64 and prevents the ratchet piece from reëngaging the universal rock shaft. Summarizing: The nontabulated position of the universal totalizer prevents the depressing of a numeral key. A tabulated position of the universal totalizer permits the depressing of a numeral key.

Sometimes it is desired to operate the columnar totalizer without operating the universal totalizer: The latter is therefore inactive. Shaft $9^u$ is therefore in its middle position. The hook piece 61 should not interfere; therefore it ought to be held open. This is accomplished by providing the mechanism with a pawl 80 fulcrumed on the framing at 81 and having an arm 82 which coöperates with a spool shaped collar 83 rigidly fastened to the shaft $9^u$. In its middle position the collar 83 permits the arm 82 to reach a lower position than it does when it is in either of its extreme positions. The pawl 80 is provided with a pawl tooth 84 coöperating with the hook 65 of the hook piece 61. The bringing of the spool to its middle position therefore allows the pawl 80 to engage the piece 61 to keep it in its noninterfering position. This is true then with the universal totalizer in its normal position. The columnar totalizer may therefore be operated without interference. The bringing of the universal totalizer into either of its active conditions causes the spool 83 to raise the pawl tooth 84 out of its engaging position and thus again renders the interlocking mechanism active.

In certain forms of account it is desirable to convert a total which is present on the totalizer into another total which has the opposite sign. The same effect is produced when instead of said total there is introduced the arithmetical complement thereof. In the machine described in the above cited patent to Wahl a total is removed from the totalizer by subtracting it out when it is positive and adding it in when it is negative. To simultaneously change the sign of said total this machine has been provided with mechanism whereby the number removed is not the total but twice said total. Let it be recalled that in the operation of the machine the total becomes visible. Moreover in the introducing of the numbers into the machine or in the copying of the total on the totalizer the highest decimal place is operated on first. Again the totalizers are provided with certain guide marks alining with a pointer upon the fixed portion of the machine which always apprises the operator of the decimal place that the machine is ready to operate on. Again any carrying that takes place always carries from right to left and never reversely. Therefore if the operator would by some means subtract from a totalizer *seriatim*, operating in highest decimal place first, lower next, twice, the figure that the pointer shows, there would be no mistake made and the final result would be that there would reappear in the totalizer the total that had previously been there but with its sign reversed. This would be the case if it would be an algebraic totalizer. In the ordinary totalizer such as described in the above cited patent to Wahl and used in the machine described in my present application there would appear the complement of the previous total which for many practical purposes is the same in effect. This machine has therefore been provided with a mechanism which causes the master gear whenever so desired to rotate a distance twice the numerical value of the depressed numeral key. Said mechanism will now be explained.

The sign changing mechanism in this case is a double distance mechanism. More specifically stated a master gear double distance mechanism. This is shown in the drawings in connection with the universal totalizer and on a larger scale in Fig. 6. All the mechanism up to and inclusive of the direct gear $6^u$ is as previous. The latter however is no longer splined to the auxiliary master gear $8^u$. Instead, the direct gear is splined and rotates with the shaft 90 (Figs. 1, 2 and 6). Rigidly fastened to said shaft is an auxiliary gear 91. Adjacent to the latter is a gear 92 of the same size which forms one piece with the auxiliary master gear $8^u$.

These are free to rotate on their supporting shaft. Somewhat in front is located a shaft 93 which is slidable in the framework and has rotatably mounted thereon between collars 94 a spool shaped gear 95. Rotatably mounted on a stud 96 which is fastened in the framing is a double gear provided with a gear of larger diameter 97 and a gear of smaller diameter 98. The two gears 97 and 98 are rigidly fastened together. The small gear 98 is always in mesh with the gear 91.

In the position of the parts illustrated in Figs. 2 and 6, the rotation of the gear 91 will be transmitted to the spool gear 95 but as the latter is not in engagement with the gear 92 the auxiliary master gear will not be rotated. This is therefore an inactive or non-operating condition of said master gear. Should the shaft 93 be moved somewhat to the right, then the left portion of the spool gear will engage the gear 92 while the right portion will still be in engagement with the gear 91. The two gears 91 and 92 will therefore move an equal amount. Therefore so will also the auxiliary master gear. This is the equal-speed position of the parts. When the shaft 93 is moved still farther to the right, then the left half of the spool gear remains in mesh with the gear 92 while the right half of said spool gear leaves the gear 91 and engages the gear 97. Any rotation of the shaft 90 is now transmitted to the master gear through the intermediation of gear 91, gear 98, gear 97, spool gear 95 and gear 92. It is evident that gear 92, and therefore the master gear also, now receives a movement much greater than it received in the preceding equal-speed position of the parts. Gears 97 and 98 are properly dimensioned to make such increased movement exactly a double movement. The result therefore is that with the shaft 93 in its left position the master gear 8ᵘ receives no movement from the direct gear; with the shaft in its middle position it receives an equal movement as the direct gear; with the shaft in its right position the master gear receives a movement double that of the direct gear.

In the machine the positioning of the shaft 93 may be brought about either manually or automatically by means of the cams. The shaft 93 at its right end, (see Fig. 1) is provided with a collar 100 rigidly fastened thereto which embraces the lower end of the stud forming part of the lever 101 fulcrumed in the framing at 102 and provided with a tension spring 103. The latter tends to bring the shaft 93 always into its left position, that is, its inactive position. The shaft can be displaced from said position by means of a handle 104 which is supported in the framing. When manually moved to the right said handle pushes upon the left end of the shaft 93. The handle 104 is prevented from being pushed back into its left position by means of a pawl tooth 106 thereon engaging a ratchet rod 107 fixed in the framing. A spring 108 fastened with one end to the handle 104 and with its other end to the framing retains said handle in engagement with said ratchet rod.

The shaft 93 is cam located as follows: The lever 101 has its upper end pinned to a link 110. This extends to the left and has its latter end pinned to the bottom of an arm forming part of the lever 111 fulcrumed in the framing at 112. The lever is provided with a horizontal arm extending from its fulcrum to the left which arm at its end supports a roller 113. Any displacement of the shaft 93 to the right is therefore accompanied by a lowering of the roller 113, and vice versa. To coöperate with said roller the columnar totalizers 13 are provided with cams 114. Said cams are adjustably fastened upon said columnar totalizers and are of three kinds, a cam contacting the roller 113 when it is in its highest position, another cam reaching somewhat lower down and contacting and bringing the roller to its middle position, and a lowest cam bringing the roller to its lowest position. It is evident that the first kind of cam brings the total sign changing mechanism into its nonactive position or rather permits this to occupy that position by removing interference from the tendency given to said mechanism to assume this position. Moreover it is evident that for this position the cam need not be present. The middle cam brings the total sign changing mechanism into its equal-speed position. The last or lowest cam brings the total sign changing mechanism into its double-speed or sign changing position.

Attention is here called to the fact that no interference exists between the cam mechanism controlling the total sign changing mechanism and the handle mechanism controlling the same. Either may be operated without affecting the other.

An example will now be given of the form of account in which calculation the total sign changing mechanism is employed. It is an account used in banks. The arrangement is as follows.

| 1 | 2 | 3 | 4 | 5 |
|---|---|---|---|---|
| Checks. | Total checks. | Deposits. | Prior balance. | Balance. |
|   |   |   |   |   |

Each day there are entered in column 1 the individual checks. In column 2 is given the sum of the checks entered for that day under column 1. Column 2 is therefore the withdrawal for that day. Under 3 is entered the deposit for the day, under 4 the prior balance and under 5 the present balance. It is evident that the number under 5 is equal to the sum of the numbers under 3 and 4 minus the number under 2. The withdrawal for the day or the number under 2 is derived as the sum of the numbers under 1 but it enters the equation just explained not as a positive number but as a negative number. It therefore has its sign changed. The mechanism therefore has its cams set up to calculate this form of account as follows. For the numbers under 1 there is provided a dummy totalizer with cams rendering the universal totalizer positive and equal-speed. The totalizer 13ᵘ used for the universal totalizer to calculate the above account is similar in structure and operation to the totalizer described in the above cited Wahl patent. For column 2 there is provided another dummy totalizer, with cams which render the universal totalizer negative and double-speed. For column 3 there is provided another dummy totalizer whose cams render the universal totalizer positive and equal-speed. The dummy totalizer for column 4 renders the universal totalizer positive and equal-speed. Column 5 renders the universal totalizer negative and equal-speed.

The operator brings the carriage of the typewriter to the beginning of the line and tabulates both the columnar totalizer and the universal totalizer simultaneously. The numbers that are printed under column 1 are footed up and their positive total is visible on the universal totalizer. The operator then tabulates the machine for column 2. He then strikes the numeral keys, a key at a time, and always the key which is momentarily being pointed out on the universal totalizer. As a result the total previously present in the universal totalizer is printed in column 2 and subtracted twice from the universal totalizer. In an algebraic totalizer it would therefore appear with its sign reversed. In the totalizer actually used it is the complement of the total that appears; but this does not harm. The operator then tabulates the machine and introduces the number in column 3. He next does the same for column 4. There thus appears in the universal totalizer the difference between the sums of numbers 3 and 4 and number 2, that is, the remainder after the withdrawal has been subtracted from the sum of the deposit and the previous balance. This is evidently the present balance. The operator now tabulates for column 5 and writes said present balance upon the paper where it is printed in its proper location while the machine automatically clears the universal totalizer ready for the next set of items.

It might be here remarked that should the present balance be negative, that is should there should be an overdraft, the operator will ordinarily recognize it as such by the fact that the universal totalizer shows in its highest decimal place a series of 99999s.

Attention is here called to the fact that in the whole explanation of the preceding calculation the cam bearing totalizers were assumed to have been dummy totalizers. Let us now assume that they are not dummy totalizers but columnar totalizers. As far as the effect upon the universal totalizer is concerned there is no difference. But now there will simultaneously be calculated the sum of the columns 1, 2, 3, 4 and 5. That is, there will now be known the sum of all the checks, the sum of all the withdrawals, the sum of all the deposits, etc. These are items which are very desirable in themselves not only as a check on the accuracy of the machine but also for their own sake as a great aid in bookkeeping. They are especially checked against totals obtained elsewhere.

The description of the machine has now been finished but it is thought advisable to call attention to some features. The universal totalizer and its operating mechanism, etc., sector, sector shaft and rock shaft have been very carefully preserved in their orientation. The connecting link between the rock shaft and the auxiliary rock shaft and the similar link between the two sector shafts have been added to allow of the displacement of the auxiliary mechanism out of alinement with the other mechanism. This displacement of the auxiliary mechanism was caused by only one factor, namely the desire to leave room for the long totalizer bar on the carriage of the typewriter. It is evident that this could have been accomplished in also other manners. A very simple one would have been to lengthen the rock shaft and sector shaft to the right a sufficient amount, and to place the universal mechanism far enough away. With this construction of parts the universal sector could be mounted upon the extension of the old sector shaft. The two sector shafts would therefore be no longer merely similar but identical. The same remark applies to the rock shafts. In fact the construction would now become to even a greater extent a repetition. In this combination there would occur, 1, a set of numeral keys each of said keys properly operating mechanism whereby, 2, the sector shaft would be displaced an amount depending upon the digital value of the numeral key then operating and 3, a rock shaft which would be moved equally no matter which is the key that is then operating.

In the specification the term "sector" is used. This has no explanatory self-evident meaning. It is a purely accidental term due to the approximate shape of the piece. The term "sector shaft" is similarly accidental and the same remark applies to the term "rockshaft." A better term for the sector shaft would be a "differential member," because the actuation of any numeral key moves this member an amount which is different for each key and dependent on the particular key operated. I shall use this latter term in the claims and wish to be understood as meaning any member in a calculating machine which moves an amount dependent on the particular numeral key operated. A better term for the rockshaft would be the "universal member," since this shaft is moved the same amount upon the actuation of any of the numeral keys.

The function of the sector itself is to transform the reciprocatory motion of the differential member into a uni-directional movement of the master wheel. It might, therefore, properly be called the digitation rectifier. However, I shall use the term "sector" in referring to this piece in the claims, and wish to be understood as meaning a member which will transform a to-and-fro motion of the differential member into a single motion of the engaging piece.

It might now be said that the machine of this application is provided with a set of numeral keys and each of these numeral keys may operate to move a differential member, and also a universal member. The differential member in its turn is provided with one sector and operates another sector and these two sectors are operated by the universal member. Each of the sectors is provided with, and operates its own master member which in turn operates its own totalizer. Moreover, the two chains of mechanism starting with the numeral keys and ending with the totalizer, both inclusive, are equal.

Attention is called to the fact that the interlock described in the above specification is applicable not only to the machine above described but to many others. In the machine of this application the columnar portion has the totalizer movable and the master wheel stationary, similarly with the universal portion of the machine. In the columnar portion the totalizer is tabulatable through the intermediation of the totalizer bar and the carriage of the typewriter. In the universal portion of the totalizer, it is tabulatable through the universal totalizer bar but it does not require the intermediation of the carriage. It is evident that there is nothing in the nature of the machine that prevents the modification thereof by the substitution of a stationary totalizer and movable master wheel instead of the movable totalizer and stationary master wheel. This remark applies equally well to each portion of the machine. The interlock would be just as necessary in the suggested construction as in the construction described in the application. Moreover each of the above indicated constructions might be varied. For instance it might be that both the columnar and universal portions are hand tabulatable. The application of the interlock is therefore possible without change of its principle to quite a large variety of forms of machines. Moreover the interlock might be made to operate in many other manners than by locking the rock shaft. For instance it might lock both master gears and this would obviously prevent the operation of the machine for either addition or subtraction. Broadly stated, the interlock might be described as a mechanism to prevent the operation of the calculating machine when the tabulatable member has not been tabulated. This tabulatable member might be a totalizer, a master gear, or even a trigger, as well known in the art. Viewed from another standpoint it might be said that the interlock is a mechanism to prevent the operating of the calculating machine whenever the decimally movable member is outside of its zone of action.

Attention is directed to my co-pending application on calculating machine, Serial Number 709,010, filed July 12, 1912, in which is claimed matter disclosed but not claimed in this application.

In some of the claims I have used numbers as ordinals to identify the separate elements of said claims. This is merely for clearness in identifying these elements. The ordinal numbers themselves do not refer to any part bearing a like number in either the drawings or specification.

As far as I am aware I am the first to produce a mechanism which includes the combination of the following two features.

1. A columnar mechanism composed of one or more columnar totalizers operating in connection with the digitation mechanism, for instance, the columnar master wheel, and which is tabulated through the intermediation of the carriage of the typewriter.

2. A universal mechanism including a universal totalizer, digitation mechanism therefor, and which is directly tabulated by the tabulator without the intermediation of the carriage of the typewriter. Moreover my invention in this regard is not limited to the particular construction shown in the drawings and described above; obviously it is applicable to construction wherein it is the totalizer that is stationary and the master wheel that moves. Denoting by decimal carriage that particular portion of the calculating machine which moves and whose location determines the decimal point of calculation then my invention might be roughly stated to be: In a calculating machine of the type described the combination of: two decimal carriages, one decimally locatable through the intermediation of the carriage and the other decimally locatable independently of the carriage.

Having thus described my invention I claim:

1. In a calculating machine the combination of: a set of numeral keys; a differential member reciprocated by any of said keys; two master wheels; and two reciprocating sectors adapted to receive a motion proportional to that of the differential member, each sector transmitting said motion into one of said master wheels.

2. In a calculating machine the combination of: a set of numeral keys; a differential member reciprocated by any of said keys; two master wheels; two reciprocating sectors adapted to receive a motion proportional to that of the differential member, each sector transmitting said motion into one of said master wheels; and two sets of reversing mechanisms, one for each of said master wheels.

3. In a calculating machine the combination of: a set of numeral keys; a differential member reciprocated by any of said keys; two master wheels; two reciprocating sectors adapted to receive a motion proportional to that of the differential member, each sector transmitting said motion into one of said master wheels; and a universal member operated equally by any key of said set and which operates on the two sectors.

4. In a calculating machine the combination of: a set of numeral keys; a differential member reciprocated by any of said keys; two master wheels; two reciprocating sectors adapted to receive a motion proportional to that of the differential member, each sector transmitting said motion into one of said master wheels; two sets of reversing mechanisms, one for each of said master wheels; and a universal member operated equally by each of said numeral keys and which operates on the two sectors.

5. In a calculating machine the combination of: a set of numeral keys; a reciprocating differential member connected to said keys; a second reciprocating differential member; and means connecting both recited differential members whereby the former drives the latter.

6. In a calculating machine the combination of: a set of numeral keys; a differential member; a second differential member; and link mechanism connecting the first recited differential member and the second recited differential member whereby the former drives the later.

7. In a calculating machine the combination of: a set of numeral keys; a differential member; a second differential member; and a parallelogram link mechanism connecting the first recited differential member to the second recited differential member whereby the former drives the latter and produces in it a movement equal to its own movement.

8. In a calculating machine the combination of: a set of numeral keys; a differential member; a second differential member; means connecting the first differential member to the second differential member whereby the former drives the latter; a universal member; a second universal member; and means connecting the first recited universal member to the second recited universal member whereby the former drives the latter.

9. In a calculating machine the combination of: a set of numeral keys; a differential member; a second differential member; link mechanism connecting these differential members whereby the former drives the latter; a universal member; a second universal member; and link mechanism connecting the first recited universal member to the second recited universal member whereby the former drives the latter.

10. In a calculating machine the combination of: a set of numeral keys; a differential member; a second differential member; parallelogram link mechanism connecting these differential members whereby the former drives the latter; a universal member; a second universal member; and parallelogram link mechanism connecting the first recited universal member to the second recited universal member whereby the former drives the latter.

11. In a calculating machine, the combination of a decimal carriage, a set of digit keys, a lock to prevent the operation of said digit keys when the carriage is in a certain position, tabulating mechanism for said decimal carriage, and means operated by said tabulating mechanism to disable said lock.

12. In a calculating machine, the combination of a decimal carriage, a set of numeral keys, tabulating mechanism for said decimal carriage, a lock for said numeral keys, said lock being normally inactive and being rendered active to lock the numeral keys by the location of the decimal carriage, and means operated by said tabulating mechanism to disable said lock.

13. In a calculating machine, the combination of a decimal carriage, a set of numeral keys, a universal member operated by said numeral keys, a lock for said universal member, said lock being normally ineffective, means for rendering said lock effective when the decimal carriage is in a certain position, tabulating mechanism, and means operated by said tabulating mechanism for disabling said lock.

14. In a calculating machine, the combination of a decimal carriage, a set of numeral keys, a lock for said numeral keys, mechanism for rendering said lock operative when the carriage is in a certain position, said means also rendering said lock inoperative when said decimal carriage is in another position, tabulating mechanism, and means operated by said tabulating mechanism for disabling said lock.

15. In a calculating machine of the type described the combination of: 1, a tabulatable decimal carriage tabulatable to bring it into its proper decimal place of its zone of action as a preliminary to the inserting of a number in the calculating machine by means of its numeral keys; 2, a lock normally tending to prevent the numeral keys from being operated; 3, a pawl normally interfering with the normal locking tendency of said lock; and 4, a projection of the tabulatable decimal carriage engaging said pawl when said tabulatable decimal carriage is outside of its zone of action, whereby said projection in said location removes said pawl interference from said lock and permits the latter to lock the numeral keys.

16. In a calculating machine, the combination of a decimal carriage, a set of numeral keys, a lock adapted to prevent the operation of the numeral keys, tabulating mechanism, and a connection between said tabulator and lock independent of said decimal carriage, said connection being operative to disable said lock whereby the tabulating of the decimal carriage disables said lock, and permits the numeral keys to be operated for the inserting of a number.

17. In a calculating machine, the combination of a decimal carriage, a set of numeral keys, a lock for said numeral keys, said lock being normally inactive, and being rendered active by the locating of said decimal carriage in a certain position, tabulating mechanism, and means independent of the carriage and operated by the tabulator for unlocking said lock whereby the tabulating of the machine releases the numeral keys, and thus permits the inserting of the number.

18. In a calculating machine of the type described the combination of: 1, a tabulatable decimal carriage, tabulatable to bring it into its proper decimal place of its zone of action as a preliminary to the inserting of a number in the calculating machine by means of the numeral keys; 2, a lock normally tending to prevent the numeral keys from being operated; 3, a pawl normally interfering with the normal locking tendency of said lock; 4, a projection on the tabulatable decimal carriage engaging said pawl when said tabulatable decimal carriage is outside of its zone of action; and 5, a connection from the tabulator to the lock whereby the operating of the tabulator unlocks the lock 2, from the numeral keys.

19. In a calculating machine of the type described the combination of: 1, a tabulatable decimal carriage tabulatable to bring it into its proper decimal place of its zone of action as a preliminary to the inserting of a number in the calculating machine by means of the numeral keys; 2, a lock to prevent the operating of the numeral keys when said tabulatable decimal carriage is outside of its tabulatable decimal zone of action; and 3, means movable into a position to engage said lock and render it nonoperating.

20. In a calculating machine of the type described the combination of: 1, a tabulatable decimal carriage tabulatable to bring it into its proper decimal place of its zone of action as a preliminary to the inserting of a number in the calculating machine by means of the numeral keys; 2, a lock to prevent the operating of the numeral keys, said lock being normally inactive and said lock being rendered active to lock the numeral keys by the locating of said tabulatable decimal carriage outside of its tabulatable zone of action; and 3, means movable into a position to engage said lock and render it nonoperating.

21. In a calculating machine of the type described the combination of: 1, a tabulatable decimal carriage tabulatable to bring it into its proper decimal place of its zone of action as a preliminary to the inserting of a number in the calculating machine by means of the numeral keys; 2, a lock adapted to prevent the numeral keys from being operated, said lock being normally nonlocking; 3, means for rendering said lock locking while said tabulatable decimal carriage is outside of its zone of action; and 4, means movable into a position to engage said lock and render it nonoperating.

22. In a calculating machine of the type described the combination of: 1, a tabulatable decimal carriage tabulatable to bring it into its proper decimal place of its zone of action as a preliminary to the inserting of a number in the calculating machine by means of the numeral keys; 2, a lock adapted to prevent the numeral keys from being operated; 3, mechanism for rendering said lock nonlocking while said tabulatable decimal carriage is within its zone of action; 4, means for rendering said lock locking while said tabulatable member is outside of its zone of action; and 5, means movable into a position to engage said lock and render it nonoperating.

23. In a calculating machine of the type described the combination of: 1, a tabulatable decimal carriage tabulatable to bring it into its proper decimal place of its zone of action as a preliminary to the inserting of a number in the calculating machine by means of the numeral keys; 2, a lock normally tending to prevent the numeral keys from being operated; 3, a pawl normally interfering with its normal locking tendency of said lock; 4, a projection on the tabulatable decimal carriage engaging said pawl when said tabulatable decimal carriage is outside of its zone of action, whereby said projection in said location removes said pawl interference from said lock and permits the latter to lock the numeral keys; and 5, a pawl movable into a position to engage the lock to prevent its operation under its normal tendency, whereby said lock is rendered nonoperating.

24. In a calculating machine, the combination of a totalizer, a second totalizer adapted to be intermittently connected to said first totalizer, a set of numeral keys adapted to insert numbers in said totalizers, a lock for said numeral keys, a gear shift for said second totalizer to determine whether or not a number set up on the numeral keys shall be entered in said second totalizer, and a dog operated by said gear shift to render said lock ineffective.

25. In a calculating machine of the type described the combination of: 1, a tabulatable totalizer; tabulatable to bring it into its proper decimal place of its zone of action as a preliminary to the inserting of a number in the calculating machine by means of the numeral keys; 2, a lock normally tending to prevent the numeral keys from being operated; 3, a pawl normally interfering with the normal locking tendency of said lock; and 4, a projection on the tabulatable totalizer engaging said pawl when said tabulatable totalizer is outside of its zone of action, whereby said projection in said location removes said pawl interference from said lock, and permits the latter to lock the numeral keys.

26. In a calculating machine of the type described the combination of: 1, a tabulatable totalizer, tabulatable to bring it into its proper decimal place of its zone of action as a preliminary to the inserting of a number in the calculating machine by means of the numeral keys; 2, a lock to prevent the operating of the numeral keys when said tabulatable totalizer is outside of its tabulatable decimal zone of action; 3, means movable into a position to engage said lock and render it nonoperating.

27. In a calculating machine of the type described the combination of: 1, a tabulatable totalizer, tabulatable to bring it into its proper decimal place of its zone of action as a preliminary to the inserting of a number in the calculating machine by means of the numeral keys; 2, a lock to prevent the operating of the numeral keys, said lock being normally inactive and said lock being rendered active to lock the numeral keys by the locating of said tabulatable totalizer outside of its tabulatable zone of action; and 3, means movable into a position to engage said lock and render it nonoperating.

28. In a calculating machine of the type described the combination of: 1, a tabulatable totalizer, tabulatable to bring it into its proper decimal place of its zone of action as a preliminary to the inserting of a number in the calculating machine by means of the numeral keys; 2, a lock adapted to prevent the numeral keys from being operated, said lock being normally nonlocking; 3, means for rendering said lock locking while said tabulatable totalizer is outside of its zone of action; and 4, means movable into a position to engage said lock and render it nonoperating.

29. In a calculating machine of the type described the combination of: 1, a tabulatable totalizer, tabulatable to bring it into its proper decimal place of its zone of action as a preliminary to the inserting of a number in the calculating machine by means of the numeral keys; 2, a lock adapted to prevent the numeral keys from being operated; 3, mechanism for rendering said lock nonlocking while said tabulatable totalizer is within its zone of action; 4, means for rendering said lock locking while said tabulatable totalizer is outside of its zone of action; and 5, means movable into a position to engage said lock and render it nonoperating.

30. In a calculating machine of the type described, the combination of: 1, a tabulatable totalizer, tabulatable to bring it into its proper decimal place of its zone of action as a preliminary to the inserting of a number in the calculating machine by means of the numeral keys; 2, a lock normally tending to prevent the numeral keys from being operated; 3, normally interfering with the normal locking tendency of said lock; 4, a projection on the tabulatable totalizer engaging said pawl when said tabulatable totalizer is outside of its zone of action, whereby said projection in said location removes said pawl interference from said lock and permits the latter to lock the numeral keys; and 5, a pawl movable into a position to engage the lock to prevent its operation under its normal tendency, whereby said lock is rendered nonoperating.

31. In a calculating machine of the type described the combination of: 1, a set of columnar totalizers; 2, digitation mechanism for said columnar totalizers; 3, a columnar totalizer support, said support bringing another columnar totalizer of the set 1, to engage the columnar digitation mechanism 2, for every new column number; 4, a universal decimal carriage reciprocating once for each number; 5, reciprocating mechanism for the universal decimal carriage, said mechanism being independent of the support 3, whereby the advancing or retracting of said support 3, for the various columns produces no effect upon the universal decimal carriage 4.

32. In a calculating machine the combination of: a columnar decimal carriage; a universal decimal carriage; a set of numeral keys; and a lock for said keys, said lock being controlled jointly by said decimal carriages.

33. In a calculating machine of the type described the combination of: 1, a set of columnar totalizers; 2, a digitation mechanism coöperating with said set 1, the set of columnar totalizers bringing a different totalizer of the set 1, to coöperate with the digitation mechanism 2, for each different column, and carrying the same totalizer past the digitation mechanism for the various decimal places of a number in any of said columns; 3, a universal decimal carriage reciprocating once for each number; 4, reciprocating means independent of the totalizer set to reciprocate said universal decimal carriage; and 5, mechanism to connect the universal decimal carriage and the totalizer set, whereby the advance for the various decimal places of a number is in unison for the set and the universal decimal carriage, but the reciprocation of the latter is independent of the former.

34. In a calculating machine the combination of: a traveling member; a set of numeral keys; a totalizer; a shiftable piece whose position is controlled by said traveling member to thereby determine the action of said numeral keys on said totalizer; and a lock for said numeral keys controlled by said shiftable piece.

35. In a calculating machine the combination of: 1, a set of numeral keys; 2, a totalizer, the operating of any of the numeral keys normally entering into the totalizer an amount determined by the value of the numeral key operating; and 3, double value mechanism connecting the totalizer and the numeral keys, capable of being brought into active condition whereby the operating of a numeral key introduces into the totalizer a value double the numeral value of the numeral key.

36. In a calculating machine the combination of: 1, a totalizer; 2, a master gear therefor; 3, a set of numeral keys for the various digits, 0, 1, 2, etc., the operating of any of the numeral keys normally moving the master gear an amount dependent upon the value of the numeral key operating; and 4, double value mechanism interposed between the numeral keys and the master gear capable of being set into active condition, whereby the operating of any of the numeral keys produces in the master gear a movement equal to twice its normal movement.

37. In a calculating machine the combination of: 1, a totalizer; 2, a set of numeral keys for the digits, 0, 1, 2, etc., coöperating with said totalizer; 3, total sign changing mechanism interposed between the totalizer and the numeral keys, whereby the operating of the numeral keys for a total on the totalizer, changes the sign of said total but retains its numerical value.

38. In a calculating machine the combination of: 1, a totalizer; 2, a set of numeral keys coöperating with said totalizer, the numeral keys having the values 0, 1, 2, etc.; and 3, total sign changing mechanism interposed between the numeral keys and the totalizer, whereby the operating of the numeral keys for the total on the totalizer converts said total into its arithmetical complement.

39. In a calculating machine the combination of: 1, a totalizer; 2, a set of numeral keys therefor the numeral keys having the values of, 0, 1, 2, etc.; 3, mechanism interposed between the totalizer and the numeral keys, and including a part, 4, adapted to be placed into an equal value position and into a double value position, the locating of the part 4 in its equal value position causing the operating of any of the numeral keys to transfer into the totalizer the value of said numeral key, and the locating of the part 4 into its double value position causing the operating of any numeral key to transfer into the totalizer double the normal value of said numeral key.

40. In a calculating machine the combination of: 1, a totalizer; 2, a set of numeral keys therefor said numeral keys having the values, 0, 1, 2, etc.; 3, mechanism interposed between the numeral keys and totalizer and adapted to be brought into an equal value condition and a double value condition; 4, a carriage traveling to determine the printing point; and 5, cam mechanism part of which is mounted on said carriage to determine the condition of said mechanism 3.

41. In a calculating machine the combination of: 1, a totalizer; 2, a set of numeral keys therefor said numeral keys having the values, 0, 1, 2, etc.; 3, a master gear interposed between the numeral keys and the totalizer and adapted to be brought into an equal value condition and a double value condition; 4, a carriage traveling to determine the printing point; and 5, cam mechanism part of which is mounted on said carriage to determine the condition of said master gear 3.

42. In a calculating machine the combination of: 1, a universal totalizer; 2, a set of numeral keys therefor said numeral keys having the values, 0, 1, 2, etc.; 3, mechanism interposed between the numeral keys and the universal totalizer and adapted to be brought into an equal value condition and a double value condition; 4, a set of columnar totalizers, one totalizer for each column; and 5, a cam on each columnar totalizer for determining the condition of the mechanism 3.

43. In a calculating machine the combination of: 1, a universal totalizer; 2, a set of numeral keys therefor said numeral keys having the values, 0, 1, 2, etc.; 3, a master gear interposed between the numeral keys and the universal totalizer and adapted to be brought into an equal value condition and a double value condition; 4, a set of columnar totalizers, one totalizer for each column; and 5, a cam on each totalizer for determining the condition of the master gear 3.

44. In a calculating machine the combination of: 1, a totalizer; 2, a set of numeral keys therefor said numeral keys having the values of 0, 1, 2, etc.; 3, mechanism interposed between the numeral keys and the totalizer and adapted to be brought into an equal value condition, double value condition and a nonoperating condition; 4, a carriage traveling to determine the printing point; and 5, cam mechanism part of which is mounted on said carriage to determine the condition of said mechanism 3.

45. In a calculating machine the combination of: 1, a totalizer; 2, a set of numeral keys therefor said numeral keys having the values of 0, 1, 2, etc.; 3, a master gear interposed between the numeral keys and the totalizer and adapted to be brought into an equal value condition, a double value condition, and a nonoperating condition; 4, a carriage traveling to determine the printing point; and 5, cam mechanism part of which is mounted on the carriage to determine the condition of said master gear 3.

46. In a calculating machine the combination of: 1, a universal totalizer; 2, a set of numeral keys therefor said numeral keys having the values 0, 1, 2, etc.; 3, mechanism interposed between the numeral keys and the universal totalizer and adapted to be brought into an equal value condition, a double value condition and a nonoperating condition; 4, a set of columnar totalizers, one totalizer for each column; and 5, a cam on each columnar totalizer for determining the condition of the mechanism 3.

47. In a calculating machine the combination of : 1, a universal totalizer; 2, a set of numeral keys therefor said numeral keys having the values, 0, 1, 2, etc.; 3, a master gear interposed between the numeral keys and the universal totalizer and adapted to be brought into an equal value condition, a double value condition, and a nonoperating condition; 4, a set of columnar totalizers, one totalizer for each column; and 5, a cam on each totalizer for determining the condition of the master gear 3.

48. In a calculating machine of the type described the combination of: 1, a carriage; 2, a set of columnar totalizers thereon; 3, a universal totalizer; 4, master mechanism for said universal totalizer, said master mechanism being adapted to be placed in an additive, nonoperative or subtractive condition by the corresponding locating of a part 5; and 6, cam mechanism part of which is mounted upon the columnar totalizers and serving to locate said part 5 in any of its three positions.

49. In a calculating machine the combination of: a traveling member; a set of numeral keys; a totalizer, actuating mechanism therefor operated by said numeral keys; and means under control of said traveling member to change the velocity ratio between said key and said actuating mechanism.

50. In a calculating machine the combination of: a set of numeral keys; a totalizer, actuating mechanism therefor operated by said numeral keys; and means to change the velocity ratio between said numeral keys and said actuating mechanism.

51. In a calculating machine the combination of: a set of numeral keys; a totalizer, actuating mechanism therefor operated by said numeral keys; and a shifting gear adapted to change the velocity ratio between said numeral keys and said actuating mechanism.

52. In a calculating machine the combination of: a differential member; a master wheel; and a shifting gear connecting said master wheel and said differential member and adapted to change the velocity ratio between said master wheel and said differential member.

53. In a calculating machine the combination of: a master wheel; a differential member adapted to drive said master wheel; and a shifting gear connection adapted to simultaneously reverse the direction in which said differential member drives said master gear and change the velocity ratio between said differential member and said master wheel.

54. In a calculating machine, the combination of a set of numeral keys, a differential member reciprocated by any of said keys, two master wheels, two sectors, and mechanism adapted to transmit the motion of said differential member to the two sectors and move said sectors simultaneously a differential amount determined by the particular key operated.

55. In a calculating machine, the combination of a set of numeral keys, a differential member reciprocated by any of said keys, two master wheels, a sector for each master wheel, mechanism connecting said differential mechanism with said sectors and adapted to move said sectors simultaneously a differential amount upon the operation of any of said keys and two sets of reversing mechanism one for each of said master wheels.

56. In a calculating machine, the combination of a set of numeral keys, a differential member reciprocated by any of said keys, two master wheels, a sector associated with each of said master wheels, means for connecting one of said sectors to said differential mechanism, other means for connecting the second of said sectors to said differential mechanism, and a universal member operated equally by each of said numeral keys and operatively connected to both sectors.

57. In a calculating machine, the combination of a set of numeral keys, a differential member reciprocated by any of said keys, two master wheels, and two independent reciprocating transmitting means, each of said means operatively associated with one of said master wheels, and each of said means being adapted to receive a motion proportional to that of the differential member and transmit said motion into its associated master wheel.

58. In a calculating machine, the combination of a set of numeral keys, a differential member reciprocated by any of said keys, two master wheels, two independent reciprocating transmitting means adapted to receive a motion proportional to that of the differential member, each of said means being associated with one of the master wheels and each of said means being also adapted to transmit said differential motion into its associated master wheel, and two sets of reversing mechanism, one for each of said master wheels.

59. In a calculating machine, the combination of a set of numeral keys, a differential member reciprocated by any of said keys, two master wheels, two independent reciprocating transmitting means, each of said means associated with one of said master wheels, and adapted to receive a motion proportional to that of the differential member, and transmit said motion into its associated master wheel, and a universal member operated equally by any of said set of numeral keys and which operates jointly on said transmitting means.

60. In a calculating machine, the combination of a set of numeral keys, a differential member reciprocated by any of said keys, two master wheels, two independent reciprocating means to receive motion of said differential member and transmit the same into said master wheels.

61. In a calculating machine, the combination of a set of numeral keys, a differential member reciprocated by any of said keys, two master wheels, two reciprocating means adapted to receive a motion proportional to that of the differential member and transmit the same into said master wheels and two sets of reversing mechanism, one for each of said master wheels.

In witness whereof, I have hereunto signed my name, this 8th day of July 1912.

ARTHUR F. POOLE.

Witnesses:
JNO. H. NELSON, Jr.,
T. G. FRANKEL.